United States Patent
Seo et al.

(10) Patent No.: US 8,688,891 B2
(45) Date of Patent: Apr. 1, 2014

(54) MEMORY CONTROLLER, METHOD OF CONTROLLING UNALIGNED MEMORY ACCESS, AND COMPUTING APPARATUS INCORPORATING MEMORY CONTROLLER

(75) Inventors: Woong Seo, Hwaseong-si (KR);
Soo-Jung Ryu, Hwaseong-si (KR);
Yoon-Jin Kim, Seoul (KR);
Young-Chul Cho, Yongin-si (KR);
Il-Hyun Park, Yongin-si (KR);
Tae-Wook Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 522 days.

(21) Appl. No.: 13/006,382

(22) Filed: Jan. 13, 2011

(65) Prior Publication Data

US 2011/0202704 A1 Aug. 18, 2011

(30) Foreign Application Priority Data

Feb. 12, 2010 (KR) ........................ 10-2010-0013390

(51) Int. Cl.
*G06F 12/00* (2006.01)
(52) U.S. Cl.
USPC ................................ 711/5; 711/154; 711/156
(58) Field of Classification Search
USPC .............................................. 711/5, 154, 156
See application file for complete search history.

(56) References Cited

U.S. PATENT DOCUMENTS

| | | | | |
|---|---|---|---|---|
| 5,539,902 A | * | 7/1996 | Sakai et al. | 711/167 |
| 5,586,282 A | * | 12/1996 | Iino et al. | 711/5 |
| 5,737,563 A | * | 4/1998 | Shigeeda | 711/5 |
| 5,805,854 A | * | 9/1998 | Shigeeda | 711/1 |
| 5,920,890 A | | 7/1999 | Moyer et al. | |
| 6,412,059 B1 | | 6/2002 | Matsuyama | |
| 6,546,453 B1 | * | 4/2003 | Kessler et al. | 711/5 |
| 6,560,679 B2 | | 5/2003 | Choi et al. | |
| 6,591,349 B1 | * | 7/2003 | Steinman et al. | 711/154 |
| 6,622,225 B1 | * | 9/2003 | Kessler et al. | 711/158 |
| 6,839,806 B2 | | 1/2005 | Murakami et al. | |
| 7,308,526 B2 | * | 12/2007 | Lakshmanamurthy et al. | 711/104 |
| 2004/0088472 A1 | * | 5/2004 | Nystuen et al. | 711/5 |
| 2006/0259679 A1 | * | 11/2006 | Schumann | 711/5 |

FOREIGN PATENT DOCUMENTS

| | | |
|---|---|---|
| JP | 2000-112820 | 4/2000 |
| JP | 2002-116954 | 4/2002 |
| KR | 10-1998-0042269 | 8/1998 |
| KR | 10-2001-0110005 | 12/2001 |

* cited by examiner

*Primary Examiner* — Stephen Elmore
(74) *Attorney, Agent, or Firm* — NSIP Law

(57) ABSTRACT

A computing apparatus for accessing a multiple bank memory is provided. The computing apparatus includes a processor, a memory and a memory controller which is configured to store data in a data buffer by accessing the memory in an aligned word unit and output, in response to a request for an unaligned memory access by the processor, requested data by extracting the request data from the data buffer.

20 Claims, 5 Drawing Sheets

MEMORY CONTROLLER, METHOD OF CONTROLLING UNALIGNED MEMORY ACCESS, AND COMPUTING APPARATUS INCORPORATING MEMORY CONTROLLER

CROSS-REFERENCE TO RELATED APPLICATION(S)

This application claims the benefit under 35 U.S.C. §119 (a) of Korean Patent Application No. 10-2010-0013390, filed on Feb. 12, 2010 in the Korean Intellectual Property Office, the entire disclosure of which is incorporated herein by reference for all purposes.

BACKGROUND

1. Field

The following description relates to a technology of achieving efficient access to a multiple bank memory in a computing apparatus.

2. Description of the Related Art

A processor, in particular, a digital signal processor may provide enhanced performance by accessing a multiple bank memory through a multi-core structure and a multi-port structure. In general, a multiple bank memory stores data in a word unit including 4 bytes. For example, a plurality of pieces of data may have a series of address values. For example, a first word corresponding to the first 4 bytes is stored in the first bank, and a second word corresponding to the second 4 bytes is stored in the second bank. A request for the first 4 bytes or the second 4 bytes is implemented through an access to a single bank. Such memory access is referred to as aligned memory access. However, in order to access a word including the second byte to fifth byte, both of the first bank and the second bank need to be accessed. Such memory access is referred to as unaligned memory access.

If an unaligned memory access occurs in a system adopting a single bank memory architecture, the memory access needs to be performed twice. In a system adopting a multi-port and multi-bank memory architecture, two banks can be simultaneously accessed through a memory controller, thereby achieving an unaligned memory access having the same memory latency as that of an aligned memory access. However, when a system has two ports and two banks, if one port accesses the two banks, the remaining port can not access any of the banks, failing to bring out any advantage for the multi port system.

SUMMARY

In one general aspect, there is provided a computing apparatus, including: a processor, a memory, and a memory controller configured to: store data in a data buffer by accessing the memory in an aligned word unit, and output, in response to a request for an unaligned memory access by the processor, requested data by extracting the requested data from the data buffer.

In the computing apparatus, the memory controller may include: a memory access manager configured to access the memory in an aligned word unit, and a tagged buffer including: at least two data buffers configured to temporarily store word data output by the memory access manager, and a tag controller configured to: extract, in response to a request for an unaligned memory access by the processor, requested data from the data buffers, and combine the extracted data and output the combined data.

In the computing apparatus, the memory may be divided into multiple banks, and the memory access manager and the tagged buffer may be provided for each of the banks.

In the computing apparatus, the tagged buffer may include: a first data buffer configured to read a first word from the multiple-bank memory, a second data buffer configured to read a second word from the multiple-bank memory, a first address buffer configured to store an address value of the first word stored in the first data buffer, a second address buffer configured to store an address value of the second word stored in the second data buffer, a tag multiplexor configured to combine requested bytes among bytes that are stored in the first and second data buffers to generate a word, and a comparator configured to control operations of the first data buffer, the second data buffer, the first address buffer, the second address buffer, and the tag multiplexer.

In another general aspect, there is provided a method of controlling memory access in a computing apparatus, the method including: performing buffering by: accessing a memory in an aligned word unit, and storing data in one of a plurality of data buffers, and in response to a request for an unaligned memory access by a processor, performing a memory access by: extracting bytes constituting requested data from the data buffers, combining the extracted bytes, and outputting the combined bytes.

In the control method, the performing of memory access may include: in response to the request for unaligned memory access by the processor, determining which data buffer among the plurality of data buffers stores the bytes included in the requested data, and in response to the corresponding bytes being stored in one or more data buffers: extracting the corresponding bytes from the one or more data buffers in which the corresponding bytes are stored, combining the extracted bytes, and outputting the combined bytes.

In the control method, the determining of the data buffer may include comparing an address of the requested data with addresses of words stored in the data buffers.

The control method may further include, after the determining of the data buffer, in response to some of the bytes included in a requested word being missing from the determined data buffer: performing data buffering by reading a word including the missing bytes from the memory, and storing the word in another data buffer.

The control method may further include, after the performing of data buffering, configuring the requested word by combining the bytes included in the word, which is read from the memory, with the bytes stored in the determined data buffer.

The control method may further include, in response to all bytes constituting the requested word being stored in a final data buffer, outputting the requested word from the final data buffer and writing the word, which has been stored in the final buffer, into a previous data buffer.

In another general aspect, there is provided a memory controller for controlling memory access of a processor, the memory controller including: a memory access manager, and a tagged buffer, wherein the memory controller is configured to: store data in a data buffer by accessing a memory in an aligned word unit, extract, in response to a request for an unaligned memory access by the processor, requested data from the data buffer, and output the extracted data.

In the memory controller, the memory access manager may be configured to access the memory in an aligned word unit, and the tagged buffer may include: at least two data buffers configured to temporarily store data output from the memory access manager, and a tag controller configured to: extract, in response to a request for an unaligned memory access by the processor, requested data from the data buffers, combine the extracted data, and output the combined data.

In another general aspect, there is provided a memory controller for controlling memory access of a processor, the memory controller configured to: store data in a data buffer by accessing a memory in an aligned word unit, extract, in response to a request for an unaligned memory access by the processor, requested data from the data buffer, and output the extracted data.

In the memory controller, the memory controller may include a memory access manager configured to access the memory in an aligned word unit, and a tagged buffer including: at least two data buffers configured to temporarily store data output from the memory access manager, and a tag controller configured to: extract, in response to a request for an unaligned memory access by the processor, requested data from the data buffers, combine the extracted data, and output the combined data In the memory controller, the tagged buffer may include: a data buffer configured to read aligned words from a memory to store the word, an address buffer configured to store an address value of the word stored in the data buffer, a tag multiplexer configured to combine requested bytes among bytes of the words stored in the data buffer, and a tag controller configured to control the data buffer, the address buffer, and the tag multiplexer.

In the memory controller, the tagged buffer may include: a first data buffer configured to read a first word from a multiple-bank memory, a second data buffer configured to read a second word from the multiple-bank memory, a first address buffer configured to store an address value of the first word stored in the first data buffer, a second address buffer configured to store an address value of the second word stored in the second data buffer, a tag multiplexor configured to combine requested bytes among bytes stored in the first and second data buffers to generate a word, and a tag controller configured to control the first data buffer, the second data buffer, the first address buffer, the second address buffer, and the tag multiplexer.

Other features and aspects may be apparent from the following detailed description, the attached drawings, and the claims.

Figure 1:
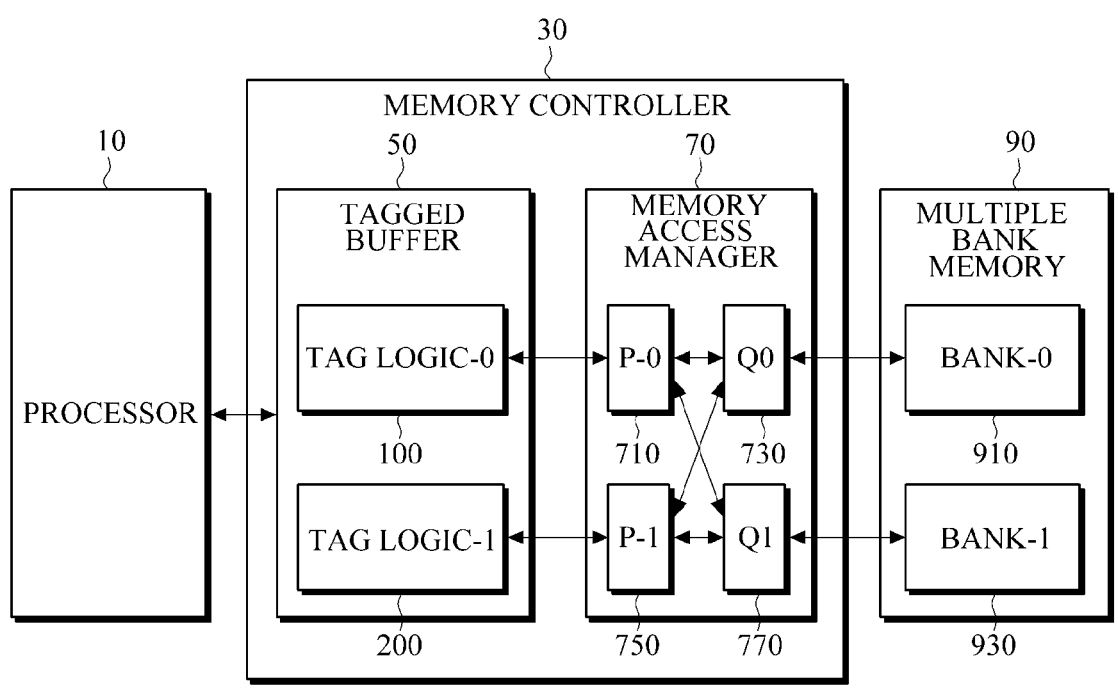
FIG. 1 is a block diagram illustrating an example of a configuration of a computing apparatus.

Throughout the drawings and the detailed description, unless otherwise described, the same drawing reference numerals will be understood to refer to the same elements, features, and structures. The relative size and depiction of these elements may be exaggerated for clarity, illustration and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a configuration of a computing apparatus. As shown in the example of FIG. 1, a computing apparatus includes a processor 10, a memory 90 and a memory controller 30. The memory controller 30 may store data in a tagged data buffer 50 by accessing the memory 90 in an aligned word unit and, in response to a request for an unaligned memory access of the processor 10, output requested data by extracting the request data from the tagged data buffer 50. The computing apparatus may be, for example, a digital signal processor, a video signal processing apparatus or a high speed computer. The processor 10 supports a multiple port and a multiple bank memory access. The memory 90 is divided into multiple banks 910 and 930 to which simultaneous access is physically enabled (hereinafter, the memory 90 having a multiple bank architecture may also be referred to as a "multiple bank memory 90"). A memory access manager 70 and the tagged buffer 50 are provided for each of the banks 910 and 930, depending on a predetermined processing unit. The memory controller 30 may be implemented as a Field Programmable Gate Array (FPGA) in a VHSIC Hardware Description Language (VHDL) code. However, the memory controller 30 may be integrated in the processor 10.

The memory controller 30 includes the memory access manager 70 to access the memory 90 in an aligned word unit and the tagged buffer 50. The memory access manager 70 has a number of ports corresponding to the number of accessible memory banks. For example, as shown in FIG. 1, the memory access manager 70 includes memory-side buffers 730 and 770 and processor-side buffers 710 and 750. Aligned words read from the memory-side buffers 730 and 770 may be copied to one of the processor-side buffers 710 and 750. As a result, the processor 10 may access one of the banks 910 and 930. The tagged buffer 50 is provided between the processor 10 and the memory access manager 70. The tagged buffer 50 includes tag logics 100 and 200 corresponding to the number of memory ports. The tag logics 100 and 200 may compare an address of a memory request, which is generated from each port, with a tag value, to determine whether to transfer the memory request to the memory access manager 70.

Figure 2:
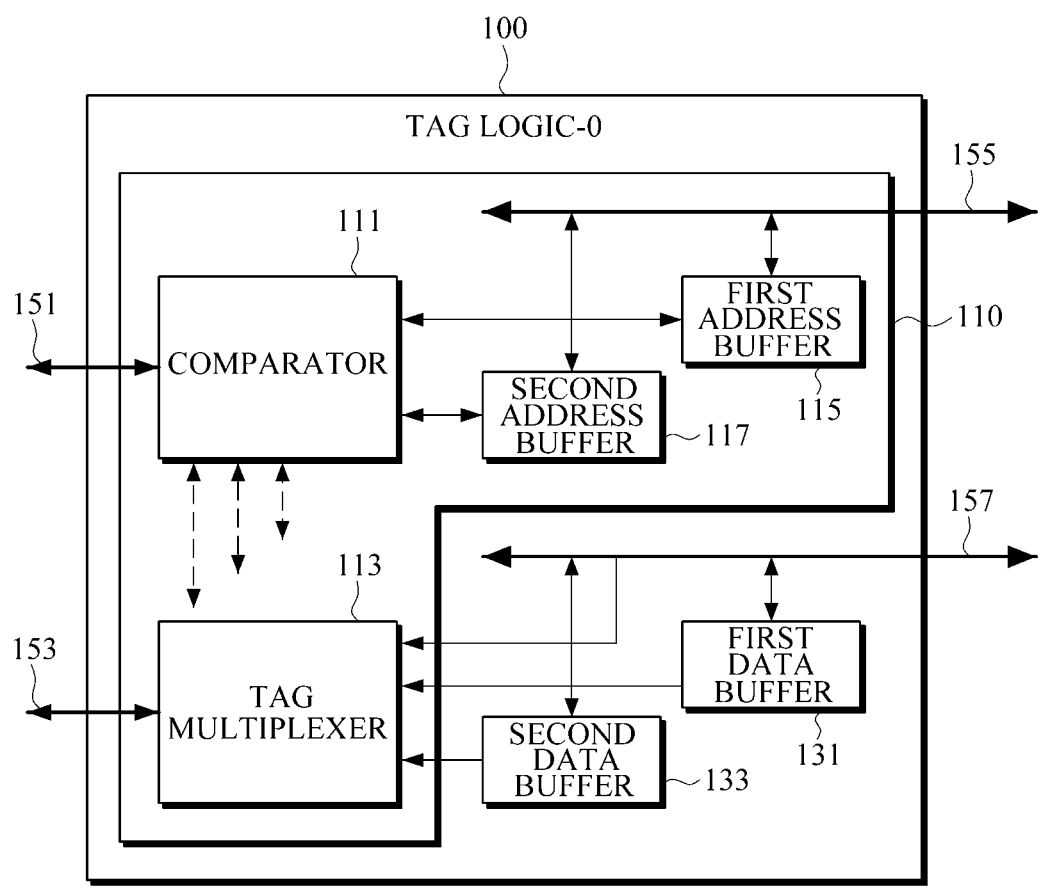
FIG. 2 is a block diagram illustrating an example of a configuration of tag logics of a memory controller shown in FIG. 1.

FIG. 2 illustrates an example of a configuration of tag logics of a memory controller of the computing apparatus shown in FIG. 1. Because tag logic 100 and 200 are similar, only tag logic 100 is illustrated in FIG. 2, for convenience. As shown in the example of FIG. 2, the tag logics 100 and 200 each include at least two data buffers 131 and 133 for temporarily storing data output from the memory access manager 70 and a tag controller 110 for extracting requested data from the data buffers 131 and 133 in response to a request for an unaligned memory access of the processor 10, combining the extracted requested data and outputting the combined data. The data buffers 131 and 133 may serve as a cache for storing data.

In one example, a tag buffer includes a first data buffer 131 for reading and storing a first word from the multiple bank memory 90 and a second data buffer 133 for reading and storing a second word from the multiple bank memory 90. The tag controller 110 includes a first address buffer 115 for storing an address value of the first word stored in the first data buffer 131, a second address buffer 117 for storing an address value of the second word stored in the second data buffer 133, a tag multiplexer 113 for combining requested bytes among bytes stored in the first data buffer 131 and the second data buffer 133 to generate a word and output the generated word, and a comparator 111 for controlling the operations of the first data buffer 131, the second data buffer 133, the first address buffer 115, the second address buffer 117 and the tag multiplexer 113.

Since the processor 10 has the two data buffers 131 and 133 for storing aligned words, in response to a request for an unaligned word, the tag multiplexer 113 may configure the requested word including four (4) sequential bytes by selecting four bytes among 8 bytes that are included in two aligned words stored in the data buffers 131 and 133.

Figure 3:
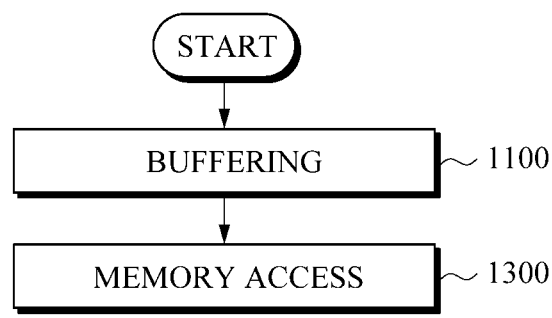
FIG. 3 is a flowchart illustrating an example of a method of controlling memory access in a computing apparatus.

Hereinafter, an example of a method of controlling a memory access in a computing apparatus is described. FIG. 3 is a flowchart illustrating an example of a method of controlling a memory access in a computing apparatus. As shown in the example of FIG. 3, the method of controlling a memory access in a computing apparatus includes performing buffering at operation 1100 and performing memory access at operation 1300. The performing of buffering at operation 1100 may be achieved by accessing a memory in an aligned word unit and storing word data in one of a plurality of data buffers. The performing of memory access at operation 1300 may include, in response to a request for an unaligned memory access by a processor, extracting bytes constituting requested data from the data buffers, combining the extracted bytes and outputting the combined bytes. Since the memory access manager 70 may access the multiple bank memory 90 in an aligned word unit, the data buffers 131 and 133 only have aligned word data in the above examples.

Figure 4:
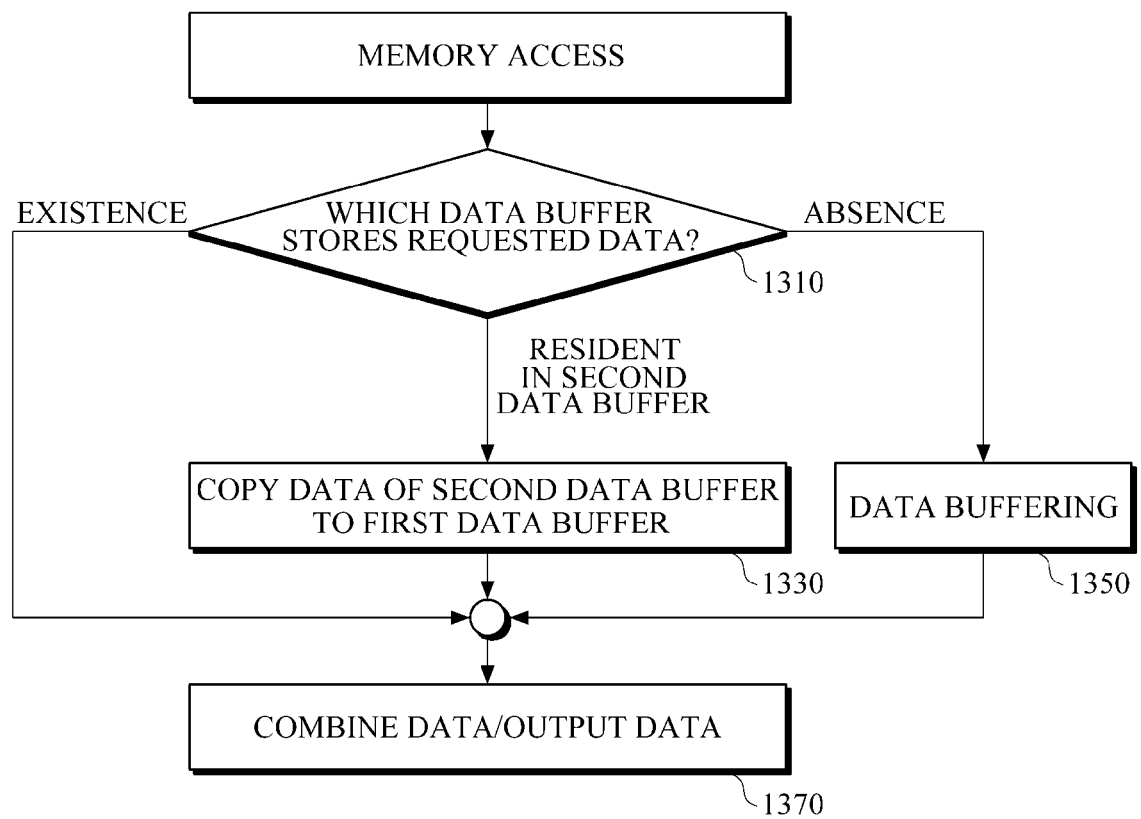
FIG. 4 is a flowchart illustrating an example of a memory access in the memory access controlling method.

FIG. 4 is a flowchart illustrating an example of the method of memory access. Referring to the example of FIG. 4 in conjunction with FIGS. 1 and 2, the performing of memory access at operation 1300 is further described. As shown FIG. 4, the performing of memory access includes determining which data buffer stores a requested data in response to a request for an unaligned memory access by a processor at operation 1310 and data combining at operation 1370. In operation 1310, it is determined in which data buffer among the data buffers some bytes constituting the requested data are stored. If the requested data exist in the second data buffer, the data is copied to the first data buffer at operation 1330. In operation 1370, if the corresponding bytes are stored in one or more data buffers, the corresponding bytes are extracted from one or more data buffers, the extracted bytes are combined and the combined bytes are output.

The determining of the data buffer at operation 1310 may be achieved by comparing an address of the requested data with addresses of words stored in the data buffers. As the processor 10 (see FIG. 1) issues a memory request, the comparator 111 (see FIG. 2) may acquire an address having the requested data from an address bus 151 and sequentially compare a requested data-address value except for the lowest 2 bits with each of the address values stored in the first address buffer 115 and the second address buffer 117. When an address value identical to the requested data-address value is stored in the first address buffer 115 or the second address buffer 117, it is determined that the requested word may be stored in at least one of the first data buffer 131 and the second data buffer 133 or over the first data buffer 131 and the second data buffer 133.

The method of controlling a memory access, in one example, further includes, after the determining of the data buffer at operation 1310, if some of bytes constituting the requested word are missing from the determined data buffer, performing data buffering at operation 1350 in which a word including the missing bytes is read from the memory and stored in another data buffer.

That is, in one example, after the determining of the data buffer at operation 1310, if some of the bytes constituting the requested word are missing from the determined data buffer, i.e., if an address value identical to the address value acquired from the address bus 151 is not stored in the first address buffer 115 or the second address buffer 117, the tag controller 110 reads a word including the missing bytes from the memory and stores the word in another data buffer at operation 1350. That is, the tag controller 110 outputs the requested data-address value except for the lowest 2 bits to an address bus 155. The tag controller 110 outputs a memory read control signal outside the tag logic. As a result, the memory access manager 70 accesses a corresponding sector of the multiple bank memory 90 to acquire requested data and loads the requested data on a data bus 157. If the first data buffer 131 is available, the tag controller 110 writes the requested data into the first data buffer 131. If the second data buffer 132 is available, the tag controller 110 writes the requested data into the second data buffer 132.

After the data buffering at operation 1350, the performing of the memory access of operation 1300 further includes configuring the requested word by combining the requested bytes included in the word, which is read from the memory in the data buffering, with the requested bytes stored in the determined data buffer.

That is, if only some of bytes constituting the requested unaligned word are stored in one of the data buffers, the tag multiplexer 113 combines the bytes acquired from the data bus 157 with the bytes stored in the data buffer, configuring the requested word. After that, the tag multiplexer 113 outputs the configured word to the processor 10 through the data bus 153.

Meanwhile, the computing apparatus may be applied to fields in which a sequential access is performed on a memory, such as, the playback of video. If all of the bytes constituting the requested word are stored in a final data buffer, the tag controller 110 outputs the requested word from the final data buffer and writes the word data, which has been stored in the final buffer, into a previous data buffer, allowing the second data buffer 133 to be available. This is because the following access is very likely to be made on a new word.

Figure 5:
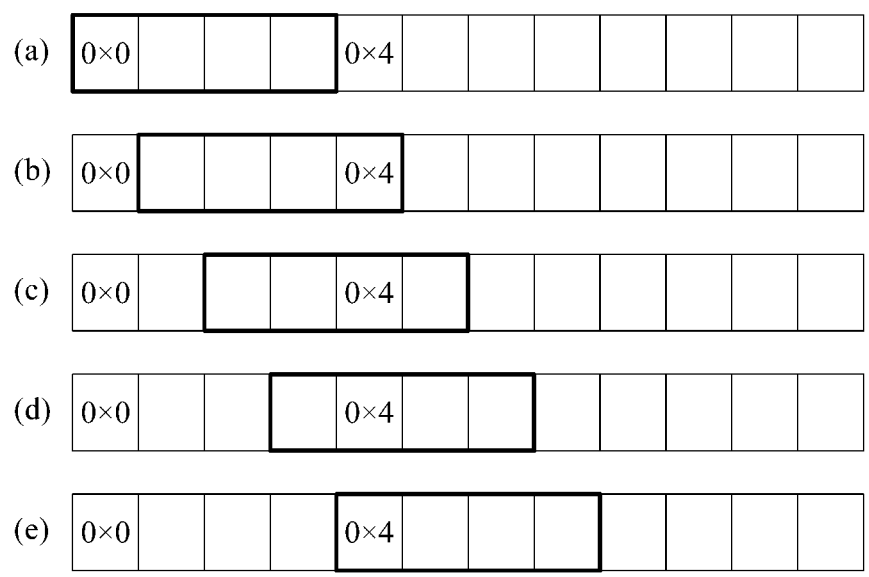
FIG. 5 is a diagram illustrating an example of the memory access controlling method.

FIG. 5 illustrates an example of the method of controlling a memory access. FIG. 5 shows addresses to be accessed by a processor. Referring to the example in FIG. 5 in conjunction with the example in FIG. 2, an operation of the tag logics and the method of controlling memory access by the tag logics are described. As shown in (a) of FIG. 5, if the processor 10 accesses a word which is stored over addresses 0 to 3 of the memory, a 0x0 address value is loaded on the address bus 151 by the processor 10. In one example, the address buffers 115 and 117, which have not been used, have meaningless values recorded therein. The comparator 111 compares each of the values stored in the address buffers 115 and 117 with the 0x0 address value loaded on the address bus 151 except for the lowest 2 bits of the 0x0 address value. Since the compared values may not be identical, the tag controller 110 loads the value, which has been loaded on the address bus 151 and makes a request for memory read. As a result, the memory access manager 70 accesses 4 bytes stored from the address 0x0 to the address 0x3 of the multiple bank memory 90 to read the 4 bytes of data. The data is loaded on the data bus 157. The tag multiplexer 113 extracts the corresponding word from the data bus 157 and loads the word on the data bus 153. In this manner, the processor 10 acquires the corresponding word. After that, the tag controller 110 writes the 0x0 address value except for the lowest two (2) bits into the first address buffer 115 and writes the data read from the data bus 157 into the first data buffer 131.

As shown in (b) of FIG. 5, in an example in which the processor 10 makes a request for an unaligned word including 4 bytes stored from the address 0x1 to the address 0x4, an 0x1 address value is loaded on the address bus 151 by the processor 10. The comparator 111 compares the 0x1 address value except for the lowest 2 bits with each of the values stored in the address buffers 115 and 117. As a result of comparison, the 0x1 address value except for the lowest 2 bits may be identical to the value stored in the first address buffer 115. However, the lowest bit of the value loaded on the address bus 151 is not "0", so the tag controller 110 adds 1 to the value, which has been loaded on the address bus 151, except for the lowest 2 bits, loads the addition result on the address bus 155, and makes a request to read the memory. As a result, the memory access manager 70 accesses an aligned word, that is, 4 bytes stored from the address 0x4 to the address 0x7 of the multiple bank memory 90 and reads the 4 bytes data. The aligned word data is loaded on the data bus 157. The tag multiplexer 113 combines the highest 1 byte of the data obtained from the data bus 157 with the highest 3 bytes stored in the first data buffer 131 to configure the unaligned word and loads the configured unaligned word on the data bus 153. In this manner, the processor 10 may acquire the requested word. After that, the tag controller 110 adds 1 to the 0x0 address value except the lowest 2 bits, writes the addition result into the second address buffer 117 and writes the data read from the data bus 157 into the second data buffer 133.

As shown in (c) of FIG. 5, in an example in which the processor 10 makes a request for an unaligned word including 4 bytes stored from the address 0x2 to the address 0x5, an 0x2 address value is loaded on the address bus 151 by the processor 10. The comparator 111 compares the 0x2 address value except for the lowest 2 bits with each of the values stored in the address buffers 115 and 117. As a result of comparison, the 0x2 address value except for the lowest 2 bits may be identical to the value stored in the first address buffer 115. In one example, a next word has been already loaded on the second address buffer 117 and the second data buffer 133, so the tag controller 110 does not make a request for additional memory access. Instead, the tag multiplexer 113 configures the unaligned word by combining the lowest two bytes stored in the first data buffer 131 with the highest two bytes stored in the second data buffer 133 and loads the configured unaligned word on the data bus 153. In this manner, the processor 10 may acquire the corresponding word.

As shown in row (d) of FIG. 5, in an example in which the processor 10 makes a request for an unaligned word including 4 bytes stored from the address 0x3 to the address 0x6, an 0x3 address value is loaded on the address bus 151 by the processor 10. The comparator 111 compares the 0x3 address value except for the lowest 2 bits with each of the values stored in the address buffers 115 and 117. As a result of comparison, the 0x3 address value except for the lowest 2 bits may be identical to the value stored in the first address buffer 115. However, a next word has been already loaded on the second address buffer 117 and the second data buffer 133, so the tag controller 110 does not make a request for additional memory access. Instead, the tag multiplexer 113 configures the unaligned word by combining the lowest 1 byte stored in the first data buffer 131 and the highest 3 bytes stored in the second data buffer 133 and loads the configured word on the data bus 153. In this manner, the processor 10 may acquire the corresponding word.

As shown in row (e) of FIG. 5, in an example in which the processor 10 makes a request for an aligned word including 4 bytes stored from the address 0x4 to the address 0x7, an 0x4 address value is loaded on the address bus 151 by the processor 10. The comparator 111 compares the 0x4 address value except for the lowest 2 bits with each of the values stored in the address buffers 115 and 117. As a result of comparison, the 0x4 address value except for the lowest 2 bits may be identical to the value stored in the second address buffer 115. The tag multiplexer 113 configures the aligned word using the 4 bytes stored in the second data buffer 133 and loads the configured word on the data bus 153. In this manner, the processor 10 may acquire the corresponding word. After that, the tag controller 110 copies the value stored in the second address buffer 117 to the first address buffer 115, copies the value stored in the second data buffer 133 to the first data buffer 131, writes a meaningless number into the second address buffer 117 such that the second address buffer 117 and the second data buffer 133 are to be available. In this manner, the second data buffer 133 may be prepared for consecutive memory access.

As described above, even though the core makes the request for memory five times, the requests may be implemented in practice by only accessing the memory two times. Accordingly, requests for memory may be reduced and power consumption required for memory access may also be reduced. In addition, relating to the memory access, the bandwidth per cycle may be improved from 32 bits×5 times/8 cycles to 32 bits×5 times/5 cycles.

The examples above are described with respect to an access in an unaligned word unit but are not limited thereto. Those skilled in the art will appreciate that the above examples may be applied to an access in an unaligned byte unit and achieve an improved performance. In one example, the comparator may operate similar to the comparator shown in FIG. 2, but the tag multiplexer serves as a tag byte selector to extract a single byte other than a plurality of bytes. In addition, the examples above have been described with respect to a data read, but may be applied to a data write.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computing apparatus, comprising:
    a processor;
    a memory; and
    a memory controller comprising a data buffer located between the memory and the processor, wherein the data buffer is configured to read and temporarily store word data output by accessing the memory in an aligned word unit, and
    wherein the memory controller is configured to
        output, in response to a request for an unaligned memory access by the processor, requested data by extracting the requested data from the data buffer.

2. The computing apparatus of claim 1, wherein the memory controller comprises:
    a memory access manager configured to access the memory in an aligned word unit; and
    a tagged buffer comprising:
        two data buffers configured to temporarily store word data output by the memory access manager; and
        a tag controller configured to:
            extract, in response to a request for an unaligned memory access by the processor, requested data from the data buffers; and
            combine the extracted data and output the combined data.

3. The computing apparatus of claim 2, wherein:
    the memory comprises a bank; and
    the memory access manager and the tagged buffer are provided for the bank.

4. The computing apparatus of claim 3, wherein the tagged buffer comprises:
    a first data buffer configured to read a first word from the multiple-bank memory;
    a second data buffer configured to read a second word from the multiple-bank memory;
    a first address buffer configured to store an address value of the first word stored in the first data buffer;
    a second address buffer configured to store an address value of the second word stored in the second data buffer;
    a tag multiplexor configured to combine requested bytes among bytes that are stored in the first and second data buffers to generate a word; and
    a comparator configured to control operations of the first data buffer, the second data buffer, the first address buffer, the second address buffer, and the tag multiplexer.

5. A method of controlling memory access in a computing apparatus, the method comprising:
    performing buffering by:
        accessing a memory in an aligned word unit; and
        reading and storing data from the memory in one of a plurality of data buffers located between the memory and the processor; and
    in response to a request for an unaligned memory access by a processor, performing a memory access by:
        extracting bytes constituting requested data from the data buffers;
        combining the extracted bytes; and
        outputting the combined bytes.

6. The control method of claim 5, wherein the performing of memory access comprises:
    in response to the request for unaligned memory access by the processor, determining which data buffer among the plurality of data buffers stores the bytes included in the requested data; and
    in response to the corresponding bytes being stored in one or more data buffers:
        extracting the corresponding bytes from the one or more data buffers in which the corresponding bytes are stored;
        combining the extracted bytes; and
        outputting the combined bytes.

7. The control method of claim 6, wherein the determining of which data buffer stores the bytes comprises comparing an address of the requested data with addresses of words stored in the data buffers.

8. The control method of claim 6, further comprising, after the determining of which data buffer stores the bytes, in response to some of the bytes included in a requested word being missing from the determined data buffer:
    performing data buffering by reading a word including the missing bytes from the memory; and
    storing the word in another data buffer.

9. The control method of claim 8, further comprising, after the performing of data buffering, configuring the requested word by combining the bytes included in the word, which is read from the memory, with the bytes stored in the determined data buffer.

10. The control method of claim 8, further comprising, in response to all bytes constituting the requested word being stored in a final data buffer, outputting the requested word from the final data buffer and writing the word, which has been stored in the final buffer, into a previous data buffer.

11. A memory controller for controlling memory access of a processor, the memory controller comprising a data buffer located between a memory and the processor, wherein the data buffer is configured to read and temporarily store word data output by accessing the memory in an aligned word unit, and wherein the memory controller is configured to:
extract, in response to a request for an unaligned memory access by the processor, requested data from the data buffer; and
output the extracted data.

12. The memory controller of claim 11, comprising:
a memory access manager configured to access the memory in an aligned word unit; and
a tagged buffer comprising:
a data buffer configured to temporarily store data output from the memory access manager; and
a tag controller configured to:
extract, in response to a request for an unaligned memory access by the processor, requested data from the data buffers;
combine the extracted data; and
output the combined data.

13. The memory controller of claim 12, wherein the tagged buffer comprises:
the data buffer configured to read aligned words from the memory to store one of the aligned words;
an address buffer configured to store an address value of the word stored in the data buffer;
a tag multiplexer configured to combine requested bytes among bytes of the words stored in the data buffer; and
the tag controller configured to control the data buffer, the address buffer, and the tag multiplexer.

14. The memory controller of claim 12, wherein the tagged buffer comprises:
a second data buffer configured to read a second word from a multiple-bank memory;
an address buffer configured to store an address value of the word stored in the data buffer;
a second address buffer configured to store an address value of the second word stored in the second data buffer;
a tag multiplexor configured to combine requested bytes among bytes stored in the first and second data buffers to generate a word; and
the tag controller configured to control the first data buffer, the second data buffer, the first address buffer, the second address buffer, and the tag multiplexer.

15. The computing apparatus of claim 1, wherein the memory controller further comprises a memory-side buffer and processor-side buffer configured to receive a word from the memory-side buffer and to provide communication with the data buffer.

16. The computing apparatus of claim 1, wherein the processor is located separately from the memory controller.

17. The control method of claim 5, wherein the performing of memory access further includes, in response to all of the corresponding bytes being stored in one or more data buffers, extracting and combining the bytes without making a request for additional memory access.

18. The control method of claim 5, wherein the performing of memory access further includes, in response to all of the corresponding bytes being stored in a final data buffer, writing a meaningless number into a final address buffer corresponding to the final data buffer to make the final data buffer and final address buffer available for consecutive memory access.

19. The memory controller of claim 11, further comprising a memory-side buffer and processor-side buffer configured to receive a word from the memory-side buffer and to provide communication with the data buffer.

20. The memory controller of claim 11, wherein the memory controller is located separately from the processor.

* * * * *